No. 613,072. Patented Oct. 25, 1898.
J. A. NICHOLS.
COMBINED PUNCHING AND SHEARING MACHINE.
(Application filed Dec. 13, 1897.)
(No Model.) 4 Sheets—Sheet I.

No. 613,072. Patented Oct. 25, 1898.
J. A. NICHOLS.
COMBINED PUNCHING AND SHEARING MACHINE.
(Application filed Dec. 13, 1897.)

(No Model.) 4 Sheets—Sheet 2.

Witnesses
J. P. Appleman.
A. W. Wilson

Inventor
John A. Nichols.
By Henry C. Evert,
Attorney

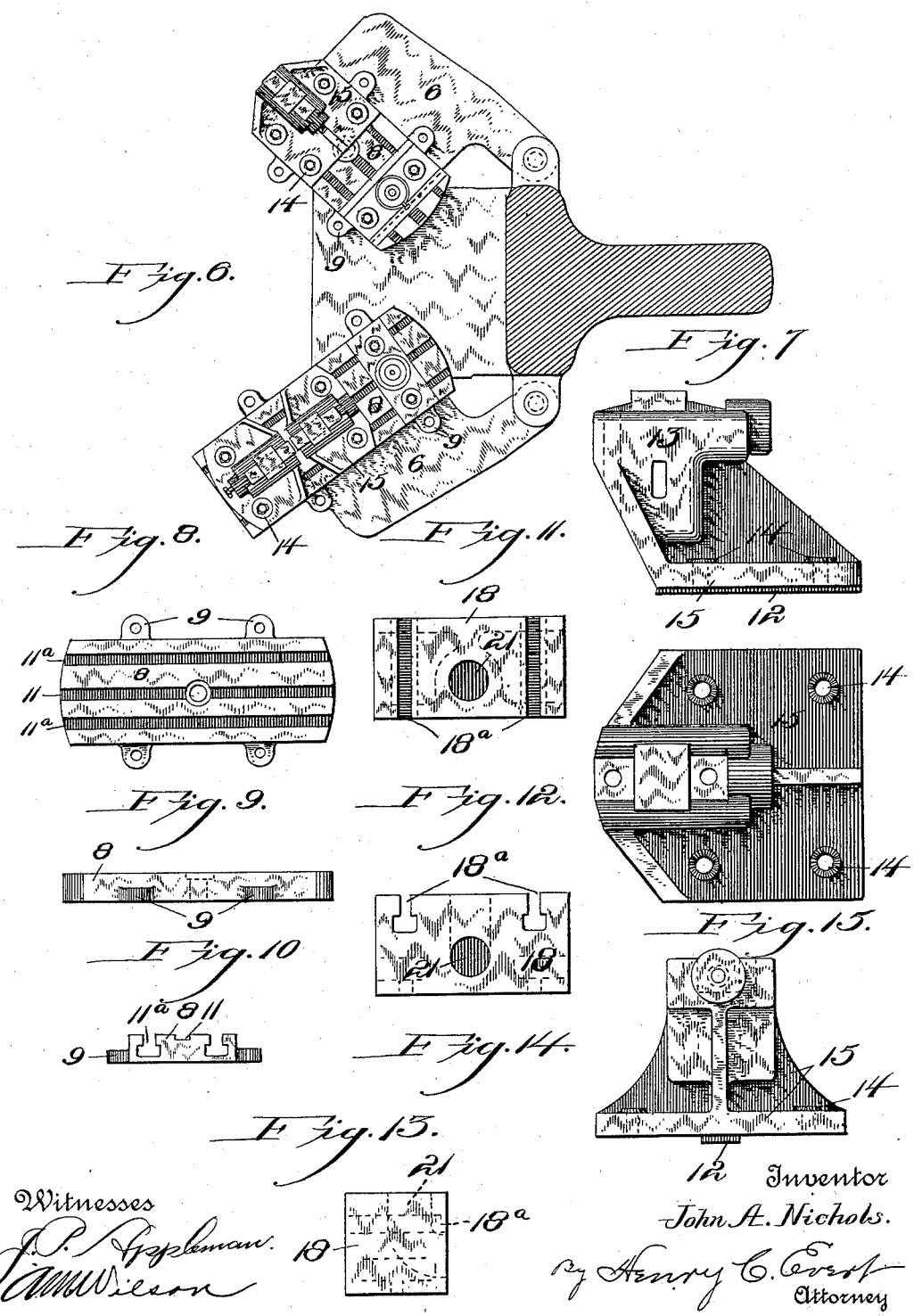

No. 613,072. Patented Oct. 25, 1898.
J. A. NICHOLS.
COMBINED PUNCHING AND SHEARING MACHINE.
(Application filed Dec. 13, 1897.)
(No Model.) 4 Sheets—Sheet 4.
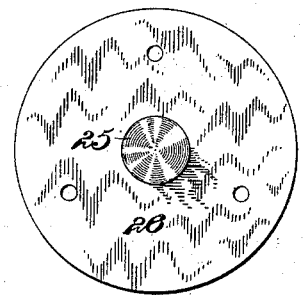
Fig. 16.
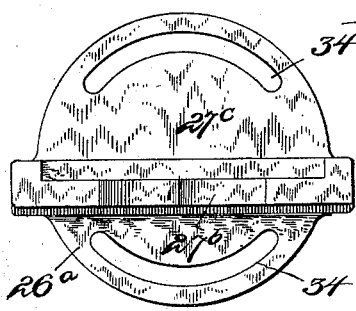
Fig. 19.
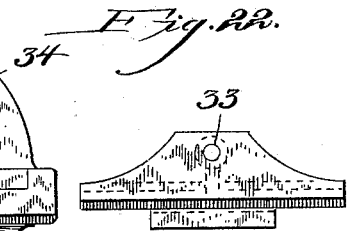
Fig. 22.
Fig. 23.
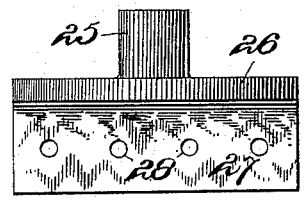
Fig. 17.
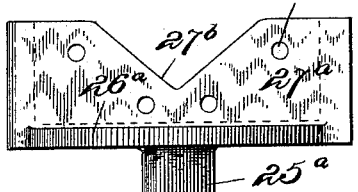
Fig. 20.
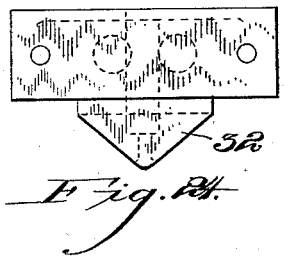
Fig. 24.
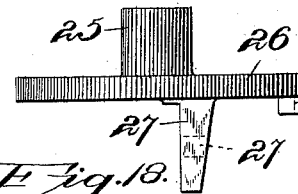
Fig. 18.
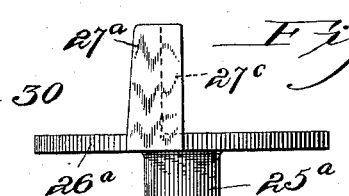
Fig. 21.
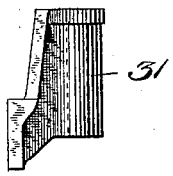
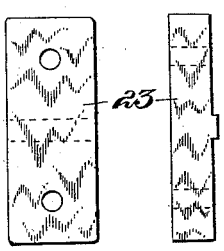
Fig. 25. Fig. 26.
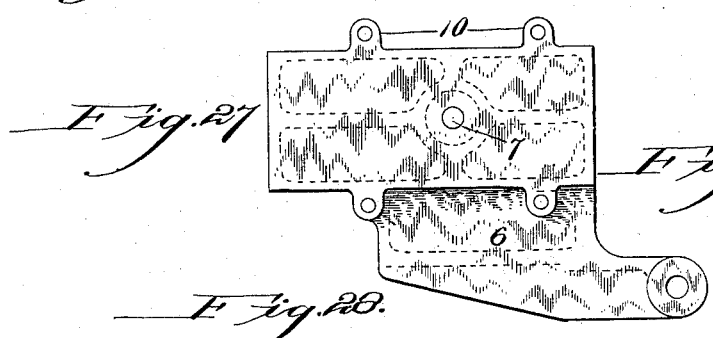
Fig. 27.
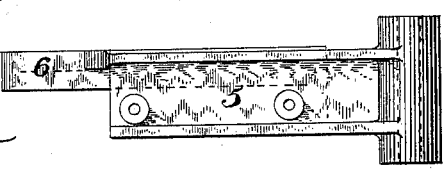
Witnesses
J. P. Appleman
A. M. Wilson
Inventor
John A. Nichols.
By Henry C. Evert
Attorney

UNITED STATES PATENT OFFICE.

JOHN A. NICHOLS, OF PITTSBURG, PENNSYLVANIA.

COMBINED PUNCHING AND SHEARING MACHINE.

SPECIFICATION forming part of Letters Patent No. 613,072, dated October 25, 1898.

Application filed December 13, 1897. Serial No. 661,661. (No model.)

*To all whom it may concern:*

Be it known that I, JOHN A. NICHOLS, a citizen of the United States of America, residing at Pittsburg, in the county of Allegheny and State of Pennsylvania, have invented certain new and useful Improvements in Punching and Shearing Machines, of which the following is a specification, reference being had therein to the accompanying drawings.

This invention relates to certain new and useful improvements in punching and shearing machines, and has for its object to provide means whereby one die-stand may be swung outward from its position underneath the punch or shear and another die-stand moved into position beneath the punch, said latter die being of a different form, so as to accommodate different sizes of material, each stand acting independently of the other and neither requiring any removal of parts in order to make the change.

The invention further aims to construct a machine which may be employed at the one side for punching beam-iron, T-iron, angle-iron, and all material of a like nature and at its opposite side be arranged for shearing like material, each mechanism operating independently of the other or coacting in unison, if desired; and to this end the invention consists in the novel construction, combination, and arrangement of parts to be hereinafter more specifically described, and particularly pointed out in the claims.

In describing the invention in detail reference is had to the accompanying drawings, forming a part of this specification, and wherein like letters and figures of reference indicate similar parts throughout the several views, in which—

Figure 1:
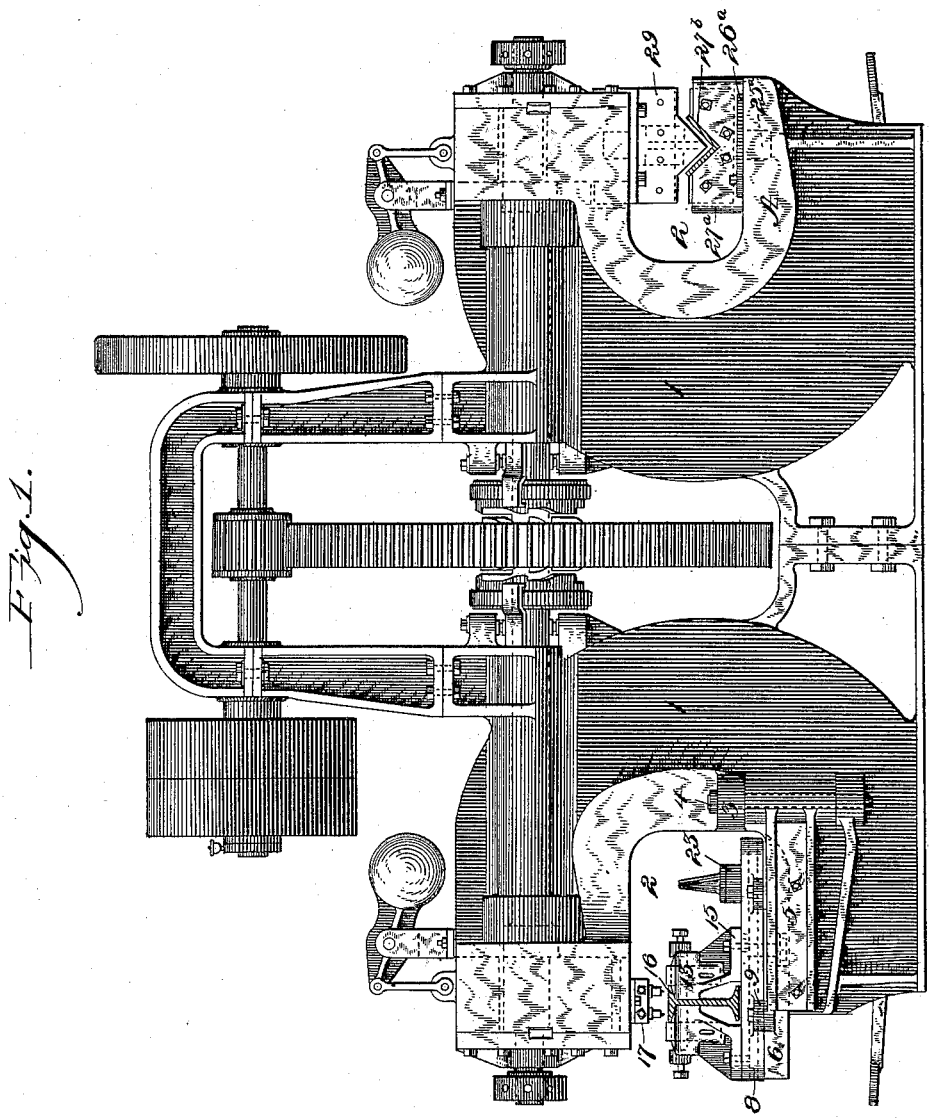

Figure 1 is a side elevation of a punching and shearing machine equipped in accordance with my invention. Figs. 2, 3, 4, and 5 are side views of a portion of the housing, showing the different forms of die-stands employed for supporting the various forms of iron to be punched and sheared. Fig. 6 is a top plan view of the table, with housing in section, showing the swinging die-stands partly opened outward from the table. Fig. 7 is a side view of the die-stand employed for punching flanges of I-beams, channels, and the like. Fig. 8 is a top plan view of the supplemental revolving table. Fig. 9 is a side view of the supplemental revolving table. Fig. 10 is an end view of the same. Fig. 11 is a top plan view of the die-stand employed for punching plates. Fig. 12 is a side view of the same. Fig. 13 is an end view of the same. Fig. 14 is an end view of the die-stand employed for punching channels and I-beams overhanging end of housing. Fig. 15 is a top plan view of the same. Fig. 16 is a top plan view of the upper-shear-knife holder. Fig. 17 is a side view of the same. Fig. 18 is an end elevation of the same. Fig. 19 is a top plan view of the lower-knife holder. Fig. 20 is a side elevation, and Fig. 21 is an end. Fig. 22 is a top plan view of the auxiliary support for the angle-knife shear. Fig. 23 is a side elevation, and Fig. 24 is an end view of the same. Figs. 25 and 26 are plan views of the die-stand employed for punching angle-iron. Fig. 27 is a top plan view of one of the swinging tables. Fig. 28 is a side view of the same.

Figure 5:
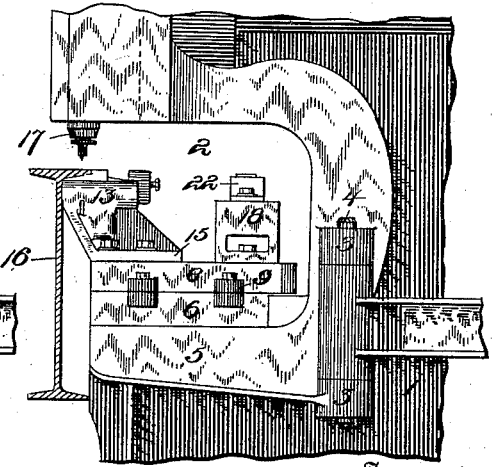

Referring now to the drawings by reference letters and figures, 1 denotes the housings, which are formed with a throat 2 and are or may be of the ordinary form of construction and support the mechanism by which machines of this nature are operated, and in which no change is made in my construction, so that no detailed reference is made to the same. These housings have formed on the sides thereof lugs 3 3, between which is journaled and secured by a bolt 4 the bracket 5, carrying the swinging table 6, which is adapted to swing upon its bolt 4, so that the same can be moved to bring it over the ordinary table at the base of the throat or outward to the side of the housing when it is not desired for use. The swinging table 6 is provided with a central aperture 7, adapted to receive a pivotal pin for fulcruming to the said swinging table and supplemental revolving table 8, provided at its sides with apertured lugs 9, adapted to receive the fastening-bolts, which engage in similar apertured lugs 10, formed on the sides of the swinging table 7. This supplemental table 8 is provided on its upper face with guideways 11 11$^a$, extending longitudinally therewith, the guideway 11 being adapted to receive the guide 12, formed on the underneath face of the die-stand 13, detail views of which are shown in Figs. 7, 14, and 15. The guideways 11ᵃ are adapted to receive the heads of bolts passing upward through apertures 14, formed in the base-plate 15 of this die-stand, thus forming the means for securing the die-stand rigidly in its position on the supplemental table 8 and for adjusting the same to any position desired. The die-stand shown in the figures above referred to is adapted to be employed for punching the flanges of I-beams, channels, and the like, and its adaptation is illustrated in Fig. 5 of the drawings, wherein is shown an I-beam of greater depth than the throat 2. By overhanging the I-beam from the die-stand, as is shown in this view, it will be observed that an I-beam or channel-bar of any depth may be readily punched in this manner. Where the I-beams or channels are of less depth, two of these die-stands may be employed, both of which are secured upon the supplemental table 8 in the same manner, so as to support the I-beam 16 between the same, and the ram-head 17, which is of the ordinary construction, may be changed to a double punch, as is shown in Fig. 2, so as to punch the two flanges at the one time, the view shown in Fig. 5 illustrating where but one row of holes is to be punched in the I-beam.

Figure 4:
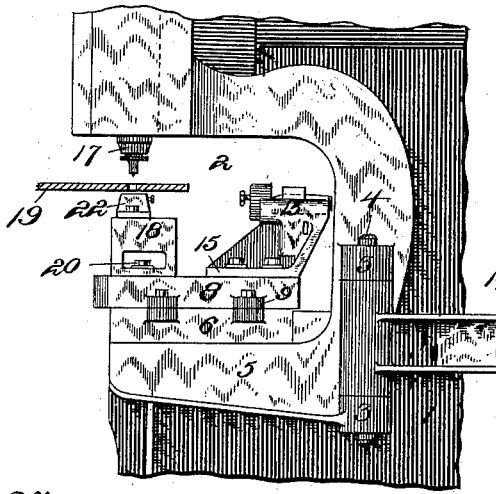

In Figs. 11, 12, and 13 I have shown detail views of the die-stand 18, which is employed for holding the plates 19 when it is desired to operate upon this shape of material, said die-stands being likewise formed with guideways 18ᵃ to receive the fastening-bolts 20, so as to make these stands adjustable in the same manner as described for the die-stands 12, and they are also provided with an aperture 21 to receive the die 22, upon which the plate 19 rests, as is illustrated in Fig. 4, and by comparing Figs. 4 and 5 it will be observed that both the die-stand 18 and the die-stand 12 are secured upon the supplemental table 8, the one being swung inward by the reversing of this supplemental table, which is readily accomplished when its fastening-bolts have been removed, and thus necessitating no change of dies when it is desired to change the work from punching I-beams to punching plates, or vice versa.

Figure 2:
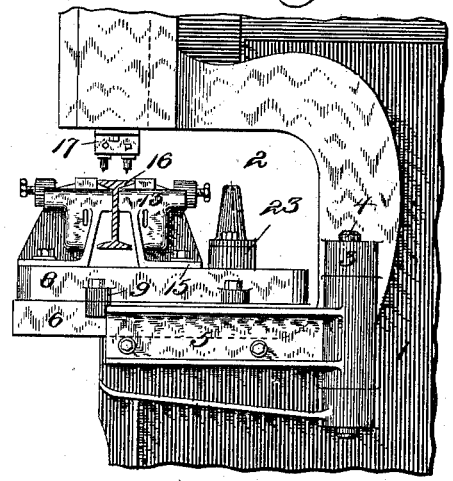
Figure 3:
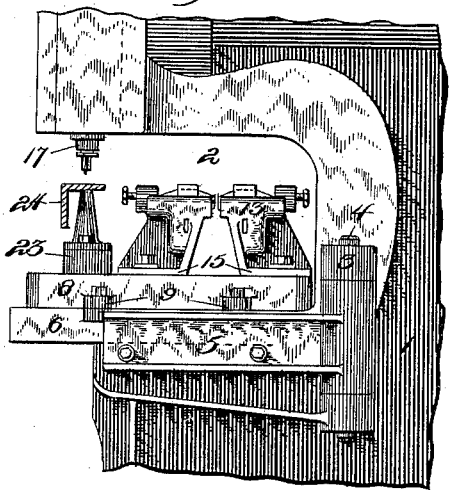

In Fig. 2, wherein is illustrated two of the die-stands employed for punching I-beams and the like, I have also shown secured upon the supplemental table a die-stand 23, which is of the form employed for punching angle-iron, as shown at 24. In Fig. 3, these two views, Figs. 2 and 3, illustrating the reversal of the tables, so as to change from angle-iron to I-beams, or vice versa, the die-stand 23 is secured to the supplemental table 8 in the same manner as for the other dies heretofore described, and is therefore also adjustable thereon. The opposite side of the machine is arranged for shearing the various forms of iron, so that the one machine may be used for both shearing and punching, and in this construction the upper-knife holder is formed with a fulcrum-pin 25, which rests in a seat formed in the housing 1 above the throat 2, said pin being formed on a disk 26, which is suitably secured to the housing by bolts tapped into the same or other desired means, carrying on its underneath side a plate or flange 27, to which the upper shear-knife 29 is rigidly attached by means of bolts passing through the said knife and through apertures 28 in the plate or flange 27. In order that the same upper-knife holder may be employed for shearing angle-iron as is employed for shearing plates, I have provided on the underneath face of the disk 26 and near the edge thereof a lug 30, which forms a support for the bracket or brace 31, which is adapted to be placed against the back of the flange or plate 27 and abut against the lug 30, this brace being formed with a downwardly-extending V-shaped portion 32, which braces the similar portion of the knife employed for cutting angle-iron, the brace being also provided with an aperture 33, through which a bolt may be passed for securing the same to the disk 26. By this arrangement the same upper-knife holder may be employed when the angle-iron-shearing knife is secured thereto as for the plate-shearing knife, the brace acting as a support for the extending portion of the knife and relieving the strain upon the same. The lower-knife holder is similarly seated by its stud or pin 25 in the housing, the disk 26ᵃ carrying an upwardly-extending plate 27ᵃ, having a V-shaped cut-away portion 27ᵇ, said plate also having recesses 27ᶜ for the reception of the lower knife, which is secured thereto by means of bolts passing through the knife and through apertures 28ᵃ in the plate 27ᵃ. In order to adjust the lower-knife holder and permit the cutting of the iron at any angle without changing the dies of the bar within the throat, I provide segmental slots 34 in the disk 26ᵃ on each side of the plate 27ᵃ and pass through these slots bolts which have been tapped or otherwise secured in the main table A. By this arrangement it will be observed that the lower-knife holder can be readily adjusted so as to cut any angle up to ninety degrees without changing the position within the throat of the bar or beam which is being cut, and thus economizing very largely in the space which would otherwise be required were the lower-knife holder stationary and this adjustment to secure the desired angle not possible.

The ram-head for both the punching and shearing is controlled by means of the ordinary treadle or lever mechanism, as may be desired, and no detailed construction is shown for the same, as I do not claim this portion of the device as any part of my invention, this operation being old and well known in the art.

Having fully described my invention, what I claim as new, and desire to secure by Letters Patent, is—

1. In a punching-machine, the housing formed with a throat, a swinging table, a revolving table secured to said swinging table, said revolving table and swinging table being adapted to swing inward within the throat until the same is brought in position beneath the punch, substantially as shown and described.

2. In a punching-machine, a swinging table fulcrumed to the housing and adapted to be moved within the throat or removed therefrom without detaching from the housing, and a supplemental revolving table secured to the swinging table, substantially as shown and described.

3. A punching and shearing machine having a swinging table which may be moved in or out of position, a lower-knife holder adjustable to shear the material at any angle without changing the position of the same, substantially as herein shown and described.

4. In a punching-machine, the combination with its housing and operating mechanism of a swinging table, a supplemental revolving table thereon, and adjustable die-stands secured on said supplemental table, substantially as shown and described.

5. In a punching and shearing machine, a housing formed with a throat, an upper-knife holder secured to said throat and an adjustable lower-knife holder having means for attaching a brace thereto to form a support for the angle-iron, knife, and permit the use of the same knife-holder for the different forms of iron, substantially as shown and described.

6. In a punching and shearing machine, the combination with the housing and operating mechanism for the punch, of a swinging table adapted to be moved in or out of position in the throat of the housing, a supplemental revolving table secured thereto, and adapted to support the various forms of die-stands which may be reversed within the throat without removing from their table, substantially as shown and described.

7. In combination with a punching-machine, a swinging table, a supplemental table secured thereto, said supplemental table supporting adjustable die-stands and means for reversing the position of the supplemental table so as to bring any desired die-stand beneath the punch, substantially as shown and described.

8. A punching and shearing machine having an upper-knife holder, an adjustable lower-knife holder having means for attaching a brace to support the material to be sheared, and a swinging table which may be moved in or out of position, substantially as herein shown and described.

In testimony whereof I affix my signature in presence of two witnesses.

JOHN A. NICHOLS.

Witnesses:
A. M. WILSON,
H. E. SEIBERT.